(12) United States Patent
Zhou

(10) Patent No.: US 11,748,896 B2
(45) Date of Patent: Sep. 5, 2023

(54) OBJECT TRACKING METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Wen Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 249 days.

(21) Appl. No.: 17/403,699

(22) Filed: Aug. 16, 2021

(65) Prior Publication Data
US 2021/0374971 A1 Dec. 2, 2021

Related U.S. Application Data

(63) Continuation of application No. PCT/CN2020/109215, filed on Aug. 14, 2020.

(30) Foreign Application Priority Data

Aug. 30, 2019 (CN) .......................... 201910819029.5

(51) Int. Cl.
*G06K 9/00* (2022.01)
*G06T 7/246* (2017.01)
(Continued)

(52) U.S. Cl.
CPC .............. *G06T 7/246* (2017.01); *G06F 18/22* (2023.01); *G06T 7/20* (2013.01)

(58) Field of Classification Search
None
See application file for complete search history.

(56) References Cited

U.S. PATENT DOCUMENTS 9,846,810 B2   12/2017 Partis
2020/0334466 A1* 10/2020 Zhou .................... G06V 10/764

FOREIGN PATENT DOCUMENTS

CN   105320944 A   2/2016
CN   109584265 A   4/2019
(Continued)

OTHER PUBLICATIONS

Tencent Technology, ISR, PCT/CN2020/109215, Nov. 20, 2020, 3 pgs.
(Continued)

*Primary Examiner* — Soo Jin Park
(74) *Attorney, Agent, or Firm* — Morgan, Lewis & Bockius LLP

(57) ABSTRACT

An object tracking method is performed by an electronic device, the method including: obtaining a target image frame currently acquired by a target camera, the target image frame including a to-be-tracked target object; in response to determining that the target object is not a current globally-tracked object, constructing a search recognition tree for the target object according to a position relationship pair database generated based on video stream data acquired by the target camera, the search recognition tree including a root node and T levels of child nodes; and recognizing, according to action values of the child nodes in the search recognition tree, a target action to be performed by the target object in a next image frame following the target image frame.

20 Claims, 7 Drawing Sheets

(51) Int. Cl.
*G06T 7/20* (2017.01)
*G06F 18/22* (2023.01)

(56) References Cited

FOREIGN PATENT DOCUMENTS

| | | |
|---|---|---|
| CN | 109697385 A | 4/2019 |
| CN | 109697393 A | 4/2019 |
| CN | 109816701 A | 5/2019 |
| CN | 110533685 A | 12/2019 |
| CN | 110533700 A | 12/2019 |

OTHER PUBLICATIONS

Tencent Technology, WO, PCT/CN2020/109215, Nov. 20, 2020, 5 pgs.
Tencent Technology, IPRP, PCT/CN2020/109215, Mar. 1, 2022, 6 pgs.

* cited by examiner

OBJECT TRACKING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/109215, entitled "OBJECT TRACKING METHOD AND APPARATUS, STORAGE MEDIUM, AND ELECTRONIC DEVICE" filed on Aug. 14, 2020, which claims priority to Chinese Patent Application No. 201910819029.5, entitled "OBJECT TRACKING METHOD AND APPARATUS, STORAGE MEDIUM, AND ELECTRONIC DEVICE" filed with the China National Intellectual Property Administration on Aug. 30, 2019, all of which are incorporated herein by reference in their entirety.

FIELD OF THE TECHNOLOGY

The present disclosure relates to the field of computers, and specifically, to an object tracking method and apparatus, a storage medium, and an electronic device.

BACKGROUND OF THE DISCLOSURE

To achieve security in public regions, video surveillance systems are generally installed in public regions. Object recognition and object tracking are performed on images acquired by the video surveillance systems through monitoring, to achieve intelligent early warning before an incident, timely warning during an incident, and efficient tracing after an incident for emergencies that occur in the public regions.

Currently, in a process of tracking a target object based on a single camera in a conventional video surveillance system, it is usually needed to obtain a plurality of frames of images acquired by the single camera for target detection, and then perform data association on detection results of the target detection. However, during the data association, due to impact of occlusion of the target object, a tracking trajectory is very likely to be interrupted, resulting in a failure in tracking the target object.

For the foregoing problem, no effective solution has been provided yet.

SUMMARY

Various embodiments of this application provide an object tracking method and apparatus, a storage medium, and an electronic device.

An object tracking method is performed by an electronic device, the method including: obtaining a target image frame currently acquired by a target camera, the target image frame including a to-be-tracked target object; in response to determining that the target object is not a current globally-tracked object, constructing a search recognition tree for the target object according to a position relationship pair database generated based on video stream data acquired by the target camera, the search recognition tree including a root node and T levels of child nodes, the root node being a node corresponding to a target key point position of the target object in the target image frame, the $i^{th}$ level of child nodes in the T levels of child nodes including a node corresponding to a key point position obtained after the target object in the $i^{th}$ image frame following the target image frame performs a candidate action, i being less than or equal to T; and predicting a target action of the target object in a subsequent image frame following the target image frame according to action values of the child nodes in the search recognition tree, the action value of each of the child nodes being used for indicating a similarity between the child node and the root node.

An object tracking apparatus is provided, including: a first obtaining unit, configured to obtain a target image frame currently acquired by a target camera, the target image frame including a to-be-tracked target object; a construction unit, configured to construct, in response to determining that the target object is not a current globally-tracked object, a search recognition tree for the target object according to a position relationship pair database generated based on video stream data acquired by the target camera, the search recognition tree including a root node and T levels of child nodes, the root node being a node corresponding to a target key point position of the target object in the target image frame, the $i^{th}$ level of child nodes in the T levels of child nodes including a node corresponding to a key point position obtained after the target object in the $i^{th}$ image frame following the target image frame performs a candidate action, i being less than or equal to T; and a recognition unit, configured to predict a target action of the target object in a subsequent image frame following the target image frame according to action values of the child nodes in the search recognition tree, the action value of each of the child nodes being used for indicating a similarity between the child node and the root node.

One or more non-transitory computer-readable storage media are provided, storing computer-readable instructions, the computer-readable instructions, when executed by one or more processors, causing the one or more processors to perform the steps of the object tracking method.

An electronic device is provided, including a memory and one or more processors, the memory storing computer-readable instructions, the computer-readable instructions, when executed by the processors, causing the one or more processors to perform the steps of the object tracking method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of the present disclosure, and a person skilled in the art may still derive other accompanying drawings according to the accompanying drawings without creative efforts.

DESCRIPTION OF EMBODIMENTS

To make a person skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

The terms such as "first" and "second" in this specification, the claims, and the foregoing accompanying drawings of the present disclosure are intended to distinguish between similar objects rather than describe a particular sequence or a chronological order. It is to be understood that data used in this way is exchangeable in a proper case, so that the embodiments of the present disclosure described herein can be implemented in an order different from the order shown or described herein. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
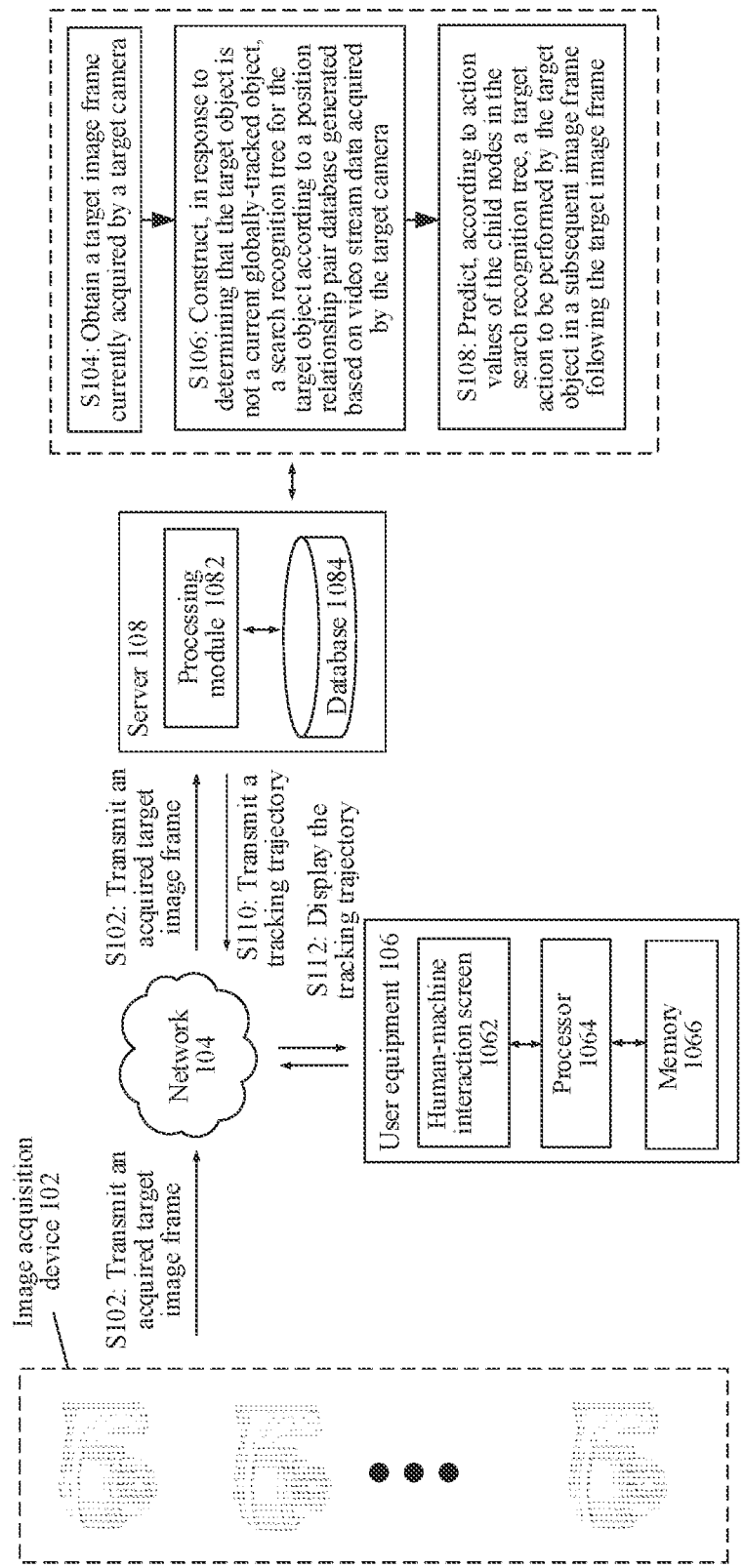
FIG. 1 is a schematic diagram of a network environment of an optional object tracking method according to an embodiment of the present disclosure.

According to one aspect of embodiments of the present disclosure, an object tracking method is provided. In some embodiments, as an optional implementation, the object tracking method may be applied to a network environment in which an object tracking system shown in FIG. 1 is located, but the present disclosure is not limited thereto. The object tracking system may include, but is not limited to: an image acquisition device 102 (for example, a camera, which may also be referred to as target camera below), a network 104, user equipment 106, and a server 108. The image acquisition device 102 is configured to acquire an image frame of a designated region, so as to monitor and track objects appearing in the region. The user equipment 106 includes a human-machine interaction screen 1062, a processor 1064, and a memory 1066. The human-machine interaction screen 1062 is configured to display the image frame acquired by the image acquisition device 102, and is further configured to obtain a human-machine interaction operation performed on the image frame. The processor 1064 is configured to determine, in response to the human-machine interaction operation, a to-be-tracked target object. The memory 1066 is configured to store the image frame. The server 108 includes a processing module 1082 and a database 1084. The processing module 1082 is configured to obtain an image frame acquired by an image acquisition device, perform feature extraction on the image frame to recognize a target object in the image frame, and construct, when the target object is not a current globally-tracked object, a search recognition tree for the target object by using a position relationship pair database; and recognize, based on action values of the child nodes in the search recognition tree, a target action to be performed by the target object in a next image frame following the target image frame, thereby overcoming the problem that a failure in tracking a target object is caused by that an occluded object in an image frame cannot be recognized.

The specific process includes the following steps. Step S102: The image acquisition device 102 transmits an acquired target image frame to the server 108 by using the network 104, and the server 108 stores the target image frame in the database 1084.

Further, the processing module 1082 in the server 108 performs steps S104 to S108: obtaining a target image frame currently acquired by a target camera, constructing, in response to determining that the target object in the target image frame is not a current globally-tracked object, a search recognition tree for the target object according to a position relationship pair database generated based on video stream data acquired by the target camera, and predicting a target action of the target object in a subsequent image frame following the target image frame according to action values of the child nodes in the search recognition tree, so as to further help accurately determine a tracking trajectory of the target object, thereby avoiding a tracking failure caused by that the target object is temporarily occluded by another object.

Next, steps S110 to S112 are performed: The server 108 transmits the tracking trajectory to the user equipment 106 by using the network 104, and the tracking trajectory of the target object is displayed on the user equipment 106.

In this embodiment, after a target image frame currently acquired by the target camera is obtained, when it is determined that a target object in a target image frame is not a current globally-tracked object, a search recognition tree is constructed for the target object according to a position relationship pair database generated based on video stream data acquired by the target camera, and a target action to be performed by the target object in a subsequent image frame following the target image frame is predicted according to action values of the child nodes in the search recognition tree. That is, the search recognition tree constructed based on a plurality of target image frames can predict an action of a currently occluded object according to action values of the object in a plurality of subsequent image frames to implement recognition on the temporarily occluded object, thereby overcoming the problem of a tracking failure caused by occlusion of an object in an image frame in the related art, and further, ensuring the accuracy of object tracking.

In some embodiments, in this embodiment, the user equipment may be, but is not limited to, a mobile phone, a tablet computer, a notebook computer, a Personal Computer (briefly referred to as PC) and other terminal devices that support running application clients. The server and the user equipment may perform, but not limited to, data exchange with each other by using a network, and the network may include, but is not limited to, a wireless network or a wired network. The wireless network includes: Bluetooth, Wi-Fi, and another network implementing wireless communication. The wired network may include, but is not limited to: a wide area network, a metropolitan area network, and a local area network. The foregoing description is merely an example, which is not limited in this embodiment.

Figure 2:
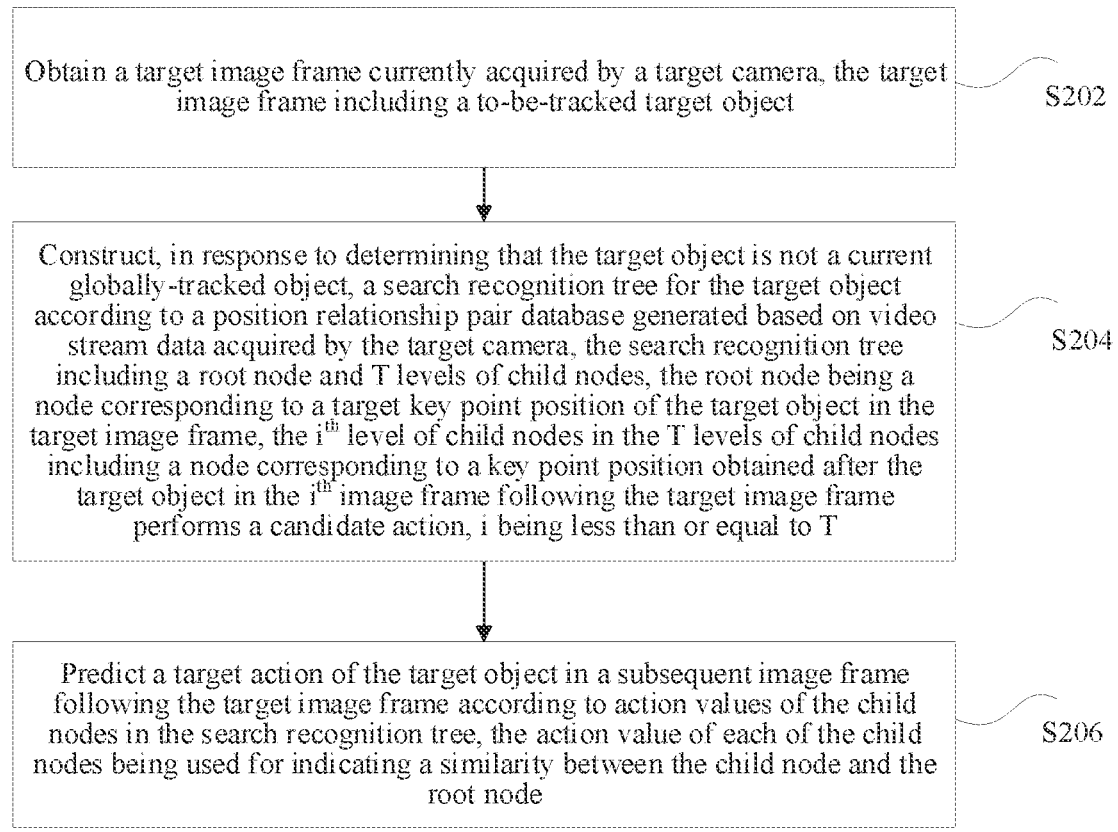
FIG. 2 is a flowchart of an optional object tracking method according to an embodiment of the present disclosure.

In some embodiments, as shown in FIG. 2, the object tracking method includes the following steps:

Step S202: Obtain a target image frame currently acquired by a target camera, the target image frame including a to-be-tracked target object.

Step S204: Construct, in response to determining that the target object is not a current globally-tracked object, a search recognition tree for the target object according to a position relationship pair database generated based on video stream data acquired by the target camera. The search recognition tree includes a root node and T levels of child nodes, the root node is a node corresponding to a target key point position of the target object in the target image frame, the $i^{th}$ level of child nodes in the T levels of child nodes include a node corresponding to a key point position obtained after the target object in the $i^{th}$ image frame following the target image frame performs a candidate action, and i is less than or equal to T.

Step S206: Predict a target action of the target object in a subsequent image frame following the target image frame according to action values of the child nodes in the search recognition tree, the action value of each of the child nodes being used for indicating a similarity between the child node and the root node.

Figure 3:
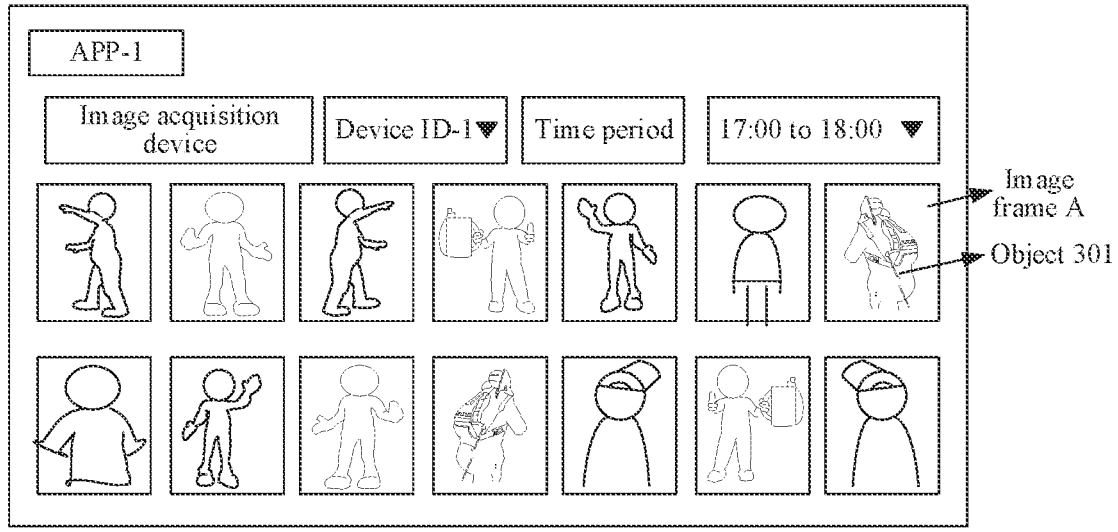
FIG. 3 is a schematic diagram of an optional object tracking method according to an embodiment of the present disclosure.

In some embodiments, in this embodiment, the object tracking method may be, but is not limited to, applied to an object monitoring platform application. The object monitoring platform application may be, but is not limited to, a platform application for real-time tracking and positioning of at least one selected target object based on images acquired by at least two image acquisition devices installed in a building. The image acquisition device may be, but is not limited to, a camera installed in the building, for example, an independent camera or an Internet of Things device equipped with a camera. The camera may include, but is not limited to at least one of the following: an RGB camera, a depth camera, and a sensor such as a lidar sensor. The building may be equipped with a map, for example, an electronic map, constructed based on building information modeling (BIM for short), but the present disclosure is not limited thereto. In the electronic map, positions of Internet of Things devices in the Internet of Things, for example, the position of the camera, are marked and displayed. As shown in FIG. 3, an object monitoring platform application APP-1 installed on a user terminal is configured to display video stream data acquired by a single camera, that is, an image acquisition device (which may also be referred to as a camera hereinafter) of which a device identification is ID-1, for example, display image frames acquired between 17:00 and 18:00. For example, an image frame A is a currently acquired target image frame and includes a to-be-tracked object 301.

In addition, in this embodiment, the target object may be, but is not limited to, a moving object recognized in an image, for example, a to-be-monitored person or vehicle. The image frame may be an image in discrete images acquired by the image acquisition device according to a predetermined period, or may be an image in a video recorded by the image acquisition device in real time. That is, an image source in this embodiment may be an image set or image frames in a video. This is not limited in this embodiment. In addition, the search recognition tree may include, but is not limited to, a Monte Carlo tree. The Monte Carlo tree is a search tool applied to an artificial intelligence problem for making the best decision, is generally an action planning form in a combinatorial game, and combines the generality of stochastic simulation and the accuracy of a tree search. The foregoing description is merely an example, which is not limited in this embodiment.

The object tracking method shown in FIG. 2 may be used in the server 108 shown in FIG. 1, but the present disclosure is not limited thereto. The object tracking method provided in the embodiments of this application may alternatively be performed by using another electronic device. After obtaining an image frame returned by a single image acquisition device 102 (which may also be referred to as a target camera hereinafter), the electronic device may construct a search recognition tree according to a position relationship pair database generated based on video stream data acquired by the single camera, so as to predict and recognize, based on the search recognition tree, an action performed by an occluded object, thereby avoiding the problem that a temporarily occluded object is likely to be lost during tracking in the related art.

It can be understood that the subsequent frame mentioned in the step of predicting a target action of the target object in a subsequent image frame following the target image frame may be specifically a next image frame of the target image frame, or may be the $n^{th}$ image frame following the target image frame, n being a positive integer greater than 1.

Figure 4:
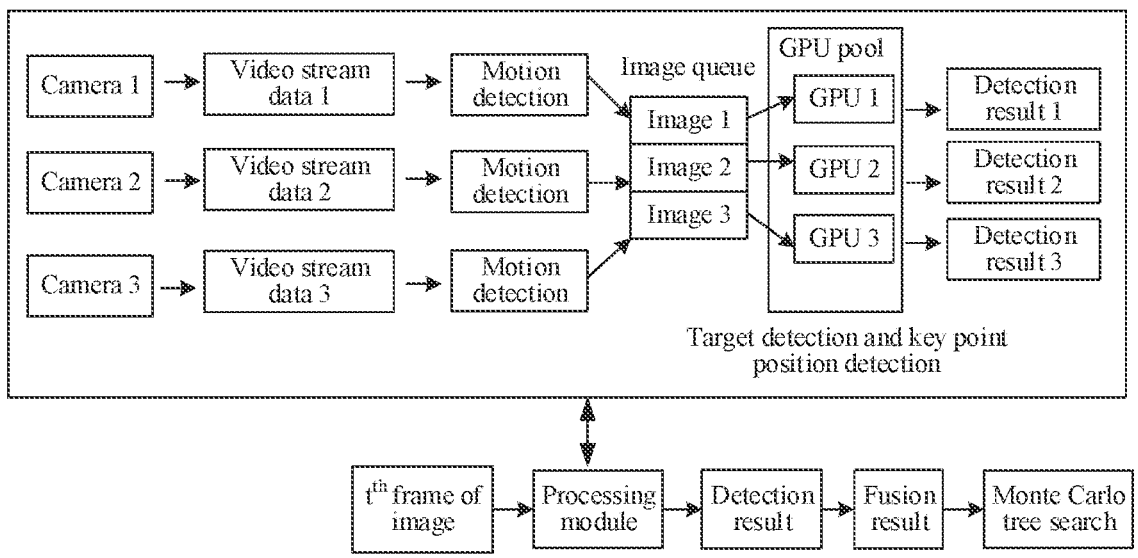
FIG. 4 is a schematic diagram of another optional object tracking method according to an embodiment of the present disclosure.

For example, FIG. 4 shows an object tracking method implemented by a server for a single camera (for example, any one of cameras 1 to 3). Assuming that the target camera is the camera 1 in FIG. 4, after acquiring video stream data 1, the camera 1 obtains a currently acquired target image frame from the video stream data 1, performs motion detection on the target image frame, and stores the target image frame in a graphics processing unit (GPU) pool when a moving object is detected, so as to facilitate target detection and key point detection on data in the GPU pool to obtain a detection result 1.

In some embodiments, the motion detection may include, but is not limited to: obtaining, by the electronic device, a moving foreground image by using an inter-frame difference, a Gaussian mixture model, and a motion detection method such as nuclear density estimation. For example, the foregoing motion detection process may include, but is not limited to: counting, by the electronic device, a quantity of pixels in the moving foreground image; when the quantity of pixels is less than a threshold, determining that a moving region is excessively small, considering that there is no moving object, and quickly returning; and when the quantity of pixels exceeds the threshold, considering, by the electronic device, that there is a moving object, and compressing a corresponding image frame into an image queue in the GPU pool.

In some embodiments, after the target detection and the key point position detection, the electronic device fuses a detection result and a current tracking result, and may calculate the following similarities such as a position similarity and an appearance similarity, but the present disclosure is not limited thereto. For example, when a similarity is less than a threshold, the electronic device considers that a new target enters a region monitored by the camera, allocates a new tracked object ID, and configures a Monte Carlo tree for the tracked object ID. Next, the electronic device searches for the tracked object ID based on the Monte Carlo tree by using a Monte Carlo tree search algorithm, to obtain a tracking result corresponding to the object ID. Key point positions may be, but are not limited to, positions of a group of key points used for determining the target object. In an example in which the target object is a target person, the key point positions may be, but are not limited to, positions of 16 key points used for determining that the target person is performing a current action.

The example shown in FIG. 4 is still used for description. Assuming that the target image frame is the $t^{th}$ image frame. After the electronic device implements the foregoing processing process by using a processing module, to obtain a detection result (such as the detection result 1), the electronic device fuses tracking results of subsequent T image frames following the $t^{th}$ frame that are obtained based on Monte Carlo tree search, to determine a tracking result of the current $t^{th}$ frame. In this way, even when an object in the $t^{th}$ frame is temporarily occluded, an action of the occluded object can be predicted by searching for actions of the object that are detected in the subsequent T image frames, so that the problem of a tracking failure caused by occlusion of the object in the related art is overcome.

It can be understood that, in some embodiments, the search recognition tree may be, but is not limited to, a Monte Carlo tree constructed according to the position relationship pair database obtained based on the video stream data acquired by the target camera. That is, when the electronic device determines to construct a search recognition tree (that is, a Monte Carlo tree) for a target image frame, the electronic device determines a root node in the Monte Carlo tree based on an action of the target object in the target image frame, and further determines corresponding child nodes in the Monte Carlo tree according to an action set of the target object in T image frames following the target image frame in the video stream data.

The construction of the child nodes is obtained by sampling from the action set. The action set needs to effectively cover a next action of the target object. The next action changes with an angle of the camera, leading to a relatively large search space.

In this embodiment, the electronic device may perform motion detection, target detection, and key point position detection on all image frames of the video stream data acquired and inputted by the target camera. Next, the position relationship pair database may be obtained through the following method: performing, by the electronic device using a bipartite graph matching algorithm, position matching on objects detected in two hierarchically adjacent frames, to determine an association relationship between the objects detected in the two frames, and establishing a key point position relationship pair such as (Oi(t−1), Oj(t)), where Oi(t−1) is used for representing a key point position of the $i^{th}$ object detected in the $(t-1)^{th}$ frame, Oj(t) is used for representing a key point position of the $j^{th}$ object detected in the $t^{th}$ frame, and the key point position relationship pair is used for representing that the two objects are the same object and use the same object ID. However, the present disclosure is not limited thereto. By analogy, a position relationship pair database is constructed according to relationships between key point position relationship pairs, to reflect action prediction of the same object in two hierarchically adjacent image frames adjacent. In this way, when a key point position of a predetermined object in a previous frame (for example, the $(t-1)^{th}$ frame) is given, the electronic device can obtain, by searching the position relationship pair database, A key point positions at which the predetermined object may appear in a next frame (for example, the $t^{th}$ frame). Further, the electronic device generates child nodes at the $t^{th}$ level in the Monte Carlo tree of the target object by using the A key point positions. The foregoing description is merely an example, which is not limited in this embodiment.

Further, in some embodiments, the process of generating the $t^{th}$ level of child nodes corresponding to the $t^{th}$ frame by the electronic device may further include, but is not limited to: obtaining, by the electronic device, an action value of each object child node at the $t^{th}$ level of child nodes. The action value may be, but is not limited to, an object similarity between the root node and the object child node. The object similarity may be, but is not limited to, a result of fusing a position similarity between key point positions respectively corresponding to the root node and the object child node and an appearance similarity between objects indicated by the key point positions.

In some embodiments after determining that the generation of the $t^{th}$ level of child nodes corresponding to the $t^{th}$ frame is completed, the electronic device may further update action values of all nodes before the $t^{th}$ level. For example, based on action values of all child nodes at the $t^{th}$ level, the electronic device updates an action value of a parent node to which the child nodes belong (that is, a node at the $(t-1)^{th}$ level). Further, in response to determining that the parent node is not the root node, the electronic device updates, based on action values of all child nodes at the $(t-1)^{th}$ level at which the parent node is located, an action value of an upper-level parent node (for example, a node at the $(t-2)^{th}$ level) to which the current parent node belongs, and so on. Until a parent node is the root node, the electronic device determines that all nodes currently generated in the search recognition tree (that is, the Monte Carlo tree) have been traversed. It can be understood that, the foregoing manner is merely a manner in which an action value is updated through node backtracking. Certainly, the action value may alternatively be updated in another manner, which is not limited in this embodiment.

Descriptions are specifically made below with reference to the following example. Assuming that the example is a multi-target object tracking process implemented for video stream data acquired by a single camera, a search recognition tree constructed for a to-be-tracked target object is a Monte Carlo tree. In this example, the Monte Carlo tree may regard the target object as an agent, and describe a state of the agent by using a position of a target box in which the target object is located and a position of a key point of the target object in an image frame, the state of the agent being a result of current multi-target object tracking using a single camera. However, the present disclosure is not limited thereto. The agent may change its own state by selecting an action from a series of finite sets of actions, calculate a matching degree between a state after the current change and an image change, determine a path corresponding to the target object in the Monte Carlo tree through actions of consecutive decisions, and evaluate a final confidence of a current path. A plurality of path decisions can be simulated by using the Monte Carlo tree, and an optimal current decision is selected from the decisions. Because image context information is taken into consideration in the method on a long time scale, the problem that the target object is lost when the target object is occluded during tracking can be resolved.

In this embodiment, the matching degree may be obtained in the following manner, but the present disclosure is not limited thereto: After determining A key point positions based on the position relationship pair database, the electronic device uses the A key point positions as key point positions corresponding to A predicted actions to be performed by the target object in a next frame, respectively determines image features corresponding to the A key point positions from the next image frame, and further, determines, by comparing the image features with an image feature of a key point position corresponding to the target object in the target image frame, action values respectively corresponding to the A key point positions during generation of the Monte Carlo tree.

In the embodiments provided in this application, after a target image frame currently acquired by the target camera is obtained, when it is determined that a target object in a target image frame is not a current globally-tracked object, the electronic device may construct a search recognition tree for the target object according to a position relationship pair database generated based on video stream data acquired by the target camera, and predict, according to action values of the child nodes in the search recognition tree, a target action to be performed by the target object in a subsequent image frame following the target image frame. That is, the search recognition tree constructed based on a plurality of target image frames can predict an action of a currently occluded object according to action values of the object in a plurality of subsequent image frames, to implement recognition on the temporarily occluded object, thereby ensuring the accuracy of object tracking.

In some embodiments, the constructing a search recognition tree for the target object according to a position relationship pair database generated based on video stream data acquired by the target camera includes the following steps:

Step SA1: Obtain T image frames acquired by the target camera after the target image frame.

Step SA2: Determine a current parent node to which the to-be-generated $i^{th}$ level of child nodes corresponding to the $i^{th}$ image frame belong.

Step SA3: Search the position relationship pair database for a target position relationship pair set associated with the current parent node, a similarity between a first key point position included in each target position relationship pair in the target position relationship pair set and a key point position corresponding to the current parent node being greater than a first threshold, and each position relationship pair in the position relationship pair database being used for recording key point positions that are of the same object before and after the object performs the candidate action and that are in two image frames acquired at adjacent times in the video stream data:

Step SA4: Obtain a second key point position matching the first key point position in the each target position relationship pair, an image frame in which the first key point position is located being ahead of an image frame in which the second key point position is located.

Step SA5: Generate the $i^{th}$ level of child nodes according to the second key point position.

Step SA6: Obtain the $(i+1)^{th}$ image frame as the $i^{th}$ image frame when the $i^{th}$ level of child nodes are not the $T^{th}$ level of child nodes yet.

Step SA7: Return to the step SA2 and repeat the steps until the $i^{th}$ level of child nodes are the $T^{th}$ level of child nodes, to obtain the search recognition tree.

In this embodiment, in the process of generating a corresponding search recognition tree (that is, the Monte Carlo tree) for the target object, the root node of the tree may be used for recording a key point position corresponding to an action performed by the target object in the target image frame, and the child nodes of the tree may be used for recording A key point positions predicted based an action set for each image frame following the target image frame. However, the present disclosure is not limited thereto. The action set may be, but is not limited to, actions respectively corresponding to key point positions in the position relationship pair database constructed based on video stream data acquired by the target camera.

Figure 5:
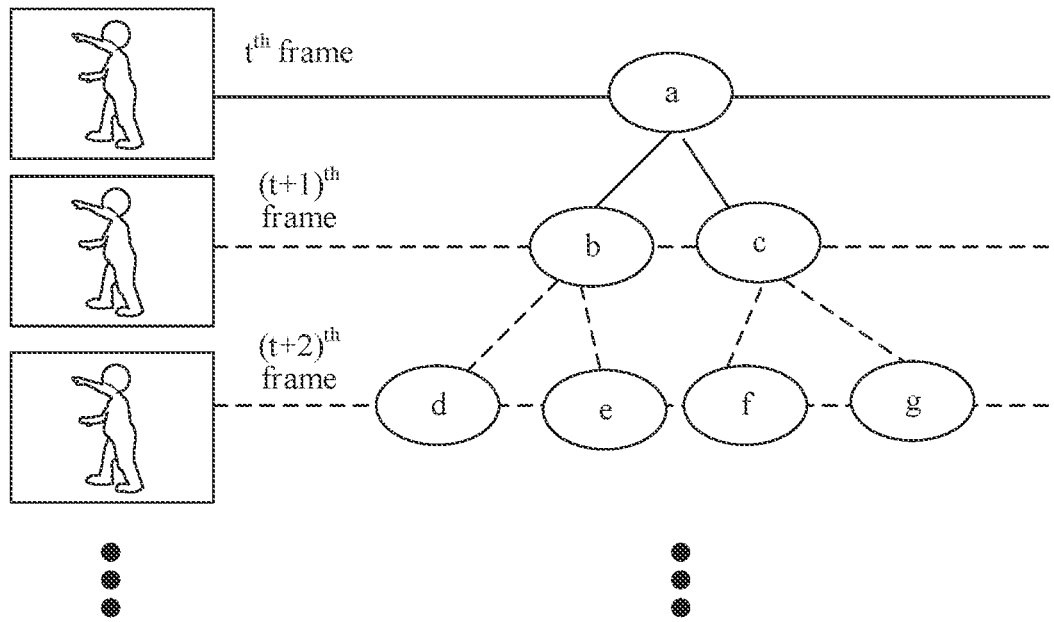
FIG. 5 is a schematic construction diagram of an optional object tracking method according to an embodiment of the present disclosure.

As shown in FIG. 5, it is assumed that the target image frame is the $t^{th}$ image frame in the video stream data acquired by the target camera. In a case that it is determined that a to-be-tracked target object (a person object shown in the figure) detected in the $t^{th}$ image frame is not a globally-tracked object, a Monte Carlo tree is constructed for the target object according to T image frames following the $t^{th}$ image frame. As shown in FIG. 5, the Monte Carlo tree includes a node a as a root node, and nodes b to g as child nodes. Using the $(t+2)^{th}$ frame as an example, the $(t+2)^{th}$ frame is the second image frame in the T image frames, and the second level of child nodes are determined correspondingly. A specific construction process may be as follows.

The second level of child nodes include nodes d to g. A current parent node to which the node d and the node e belong is a node b in the first level of child nodes, and a current parent node to which the node f and the node g belong is a node c in the first level of child nodes. Using the node d and the node e as an example, the electronic device searches the position relationship pair database for a target position relationship pair set associated with the node d. A similarity between the first key point position in the each target position relationship pair in the target position relationship pair set and a key point position corresponding to the node b is greater than a first threshold. A second key point position corresponding to the first key point position in the each target position relationship pair in the target position relationship pair set is obtained, to predict, according to the second key point position, an action that may be performed after the node b is performed. The first key point position and the second key point position are key point positions corresponding to actions indicated in two hierarchically adjacent image frames in the video stream data. An image frame corresponding to the first key point position is ahead of an image frame corresponding to the second key point position.

Further, assuming that there are two first key point positions with a similarity between the first key point position and a key point position corresponding to the node b greater than the first threshold, correspondingly, the electronic device determines that the target position relationship pair set includes two target position relationship pairs, determines, according to two second key point positions, to perform two predicted actions, and generates child nodes based on two corresponding key point positions after the two predicted actions are performed, that is, the node d and the node e after the node b is added. By analogy, the node f and node g can be obtained until a preset depth T of the Monte Carlo tree is reached. In this way, it is ensured that each level of child nodes of the Monte Carlo tree correspond to an image frame, to buffer T subsequent image frames following the $t^{th}$ image frame, and further determine, in the current $t^{th}$ image frame according to the subsequent image frames, information such as a target action to be performed by the target object or a key point position corresponding to the target action.

In this embodiment provided in this application, during the construction of the child nodes in the search recognition tree, when the $i^{th}$ level of child nodes corresponding to the $i^{th}$ image frame are determined, a target position relationship pair set associated with a parent node to which the $i^{th}$ level of child nodes belong may be searched for in the position relationship pair database, and an action that may be performed by the target object after an action corresponding to the parent node is performed is further predicted by using the second key point position matching the first key point position in the target position relationship pair set, so that the Monte Carlo tree corresponding to the target object is accurately and quickly established, to help to determine, through a subsequent search, a corresponding action when the target object is occluded.

In some embodiments, there is at least one second key point position, and the generating the $i^{th}$ level of child nodes according to the second key point position includes the following steps:

Step SB1: Generate a current object child node for a current second key point position.

Step SB2: Extract a first image feature corresponding to the current second key point position from the $i^{th}$ image frame.

Step SB3: Compare the first image feature with a second image feature that is extracted from the target image frame and that corresponds to the target key point position, to obtain a position similarity and an appearance similarity between the current object child node and the root node.

Step SB4: Determine an object similarity between the current object child node and the root node according to the position similarity and the appearance similarity.

Step SB5: Use the object similarity as an action value of the current object child node, and determine that the generation of the current object child node is completed.

Step SB6: Obtain a next second key point position from the at least one second key point position as a current second key point position, return to step SB1, and repeat the steps until generation of object child nodes respectively corresponding to the at least one second key point position is completed.

Step SB7: Determine the $i^{th}$ level of child nodes corresponding to the $i^{th}$ image frame according to the finally generated object child nodes respectively corresponding to the at least one second key point position.

In some embodiments, in this embodiment, the position similarity may be, but is not limited to, a position similarity between key point positions, and may be determined in the following manner: The electronic device may extract an image feature from a surrounding region of a current key point position (corresponding to the current object child node) in the $i^{th}$ image frame, extract an image feature from a surrounding region of a key point position (corresponding to the root node) in the target image frame, and then calculate an overlap efficient between the root node and the current object child node as a position similarity between the key point positions.

In addition, in this embodiment, the appearance similarity may be, but is not limited to, an appearance similarity between objects indicated by actions corresponding to key point positions. The appearance similarity may be determined in the following manner: The electronic device extracts an image feature from a surrounding region of a current key point position (corresponding to the current object child node) in the $i^{th}$ image frame, extract an image feature from a surrounding region of a key point position (corresponding to the root node) in the target image frame, and then calculate an appearance similarity through a dot product operation.

As shown in FIG. 5, it is assumed that the target image frame is the $t^{th}$ image frame in the video stream data acquired by the target camera. In a case that it is determined that a to-be-tracked target object (a person object shown in the figure) detected in the $t^{th}$ image frame is not a globally-tracked object, a Monte Carlo tree is constructed for the target object according to T image frames following the $t^{th}$ image frame. As shown in FIG. 5, the Monte Carlo tree includes a node a as a root node, and nodes b to g as child nodes.

Figure 6:
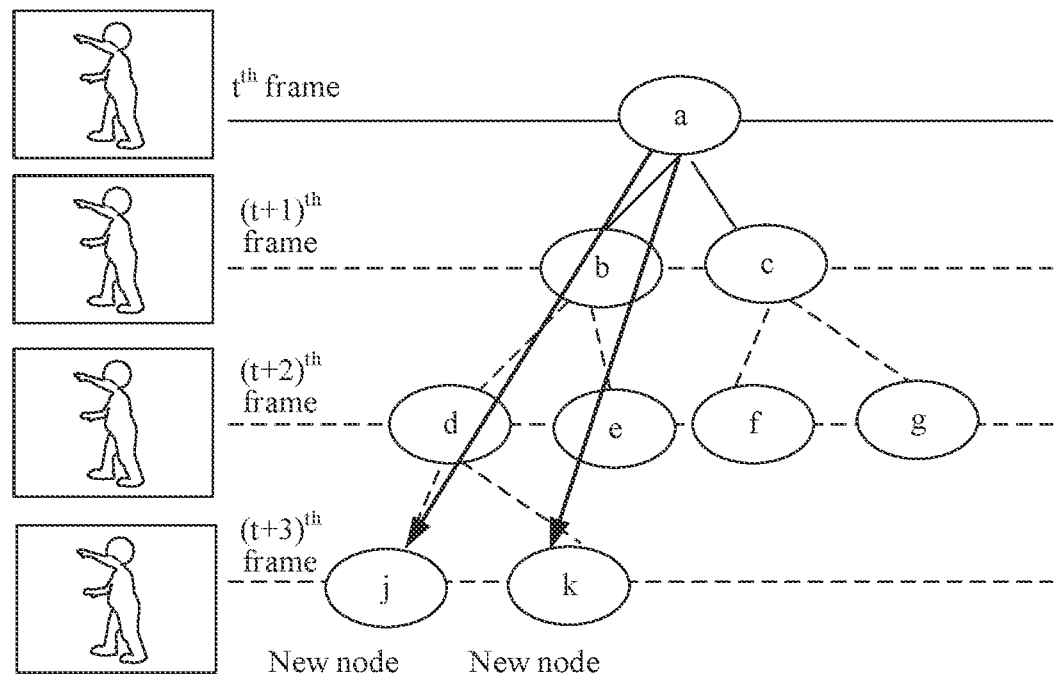
FIG. 6 is a schematic construction diagram of another optional object tracking method according to an embodiment of the present disclosure.

Further, as shown in FIG. 6, it is assumed that a parent node of current $i^{th}$ level of child nodes (child nodes corresponding to the $(t+3)^{th}$ frame shown in FIG. 6) is a node d. The current $i^{th}$ level of child nodes, that is, a new node j and a new node k, are determined according to the foregoing embodiment. Using the new node j as an example, a process of determining an action value of the new node j may be as follows:

After determining a key point position of a predicted action J corresponding to the new node j, the electronic device extracts a first image feature corresponding to the key point position of the predicted action J from the $i^{th}$ image frame (the $(t+3)^{th}$ frame shown in FIG. 6) corresponding to the $i^{th}$ level of child nodes, and obtains a second image feature that is extracted from a target image frame and that corresponds to a target key point position. The electronic device obtains an overlap efficient by comparing the first image feature with the second image feature, to determine a position similarity $\alpha 1$ between the new node j and a root node a, and determines an appearance similarity $\alpha 2$ between the new node j and the root node a through a dot product operation by comparing the first image feature with the second image feature.

Further, the electronic device may perform a weighted summation on the position similarity $\alpha 1$ and the appearance similarity $\alpha 2$, to obtain an object similarity $\alpha$ between the new node j and the root node a, and use the object similarity $\alpha$ as an action value of the new node j. By analogy, an action value of the new node k is calculated. As shown in FIG. 6, bold lines each having an arrow are used for representing the object similarity (that is, the action value of the new node j) between the root node a and the new node j and an object similarity (that is, the action value of the new node k) between the root node a and the new node k. After the action values are calculated, it is determined that the process of generating the new node j and the new node k in the $i^{th}$ level of child nodes in the Monte Carlo tree is completed.

In this embodiment provided in this application, the electronic device may represent a similarity between each of the child nodes and the root node by using an action value. The similarity is determined based on a position similarity and an appearance similarity that are obtained based on image features of surrounding regions of key point positions extracted from image frames. The action value objectively reflects a matching degree between the child node and the root node, to help to subsequently accurately predict, based on the action value, an action that may be performed by a target object, thereby further ensuring the accuracy of a tracking trajectory of the target object, and avoiding a case that the target object is lost during tracking.

In some embodiments, after the generating the $i^{th}$ level of child nodes according to the second key point position, the method further includes the following steps:

Step SC1: Update an action value of the current parent node according to all action values of the $i^{th}$ level of child nodes.

Step SC2: Determine, when the current parent node is not the root node, an upper-level parent node to which the current parent node belongs; and update, according to all action values of child nodes at the same level as the current parent node, an action value of the upper-level parent node to which the current parent node belongs.

In some embodiments, in this embodiment, after determining action values of the $i^{th}$ level of child nodes, the electronic device further backtracks and updates action values of the $(i-1)^{th}$ level of child nodes, and so on, until the root node is reached. A manner of the backtracking and updating may include, but is not limited to: obtaining, by the electronic device, a quantity of times of access to a given parent node of the $(i-1)^{th}$ level, obtaining a summation result of action values of the $i^{th}$ level of child nodes that belong to the given parent node, and then updating an action value of the parent node according to a ratio of the summation result to the quantity of times of access, so that an action value of an upper-level parent node can more accurately reflect a matching degree between the parent node and the root node through the backtracking and updating.

Figure 7:
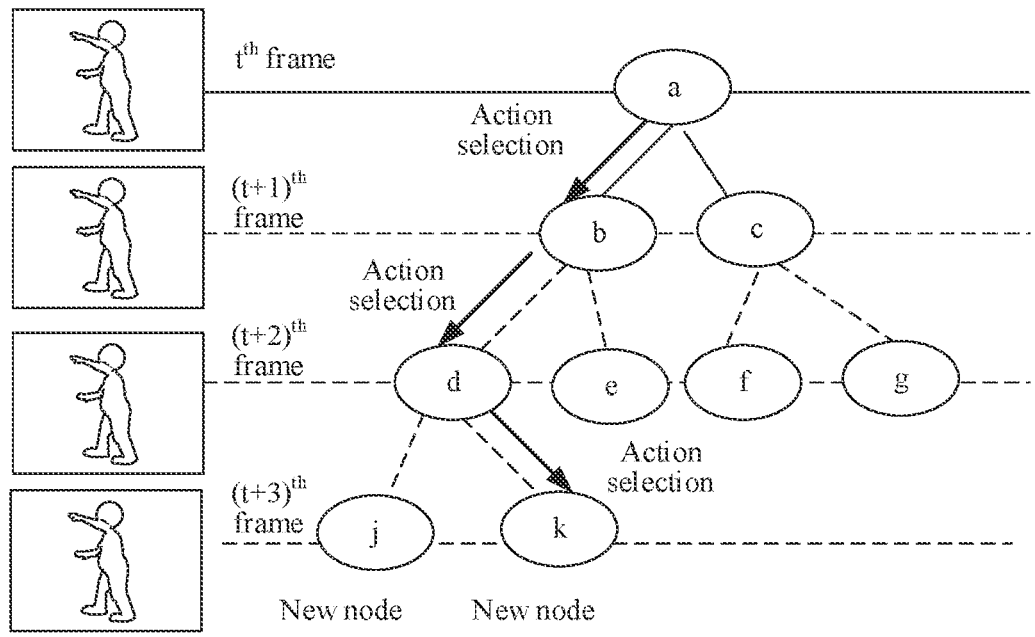
FIG. 7 is a schematic construction diagram of still another optional object tracking method according to an embodiment of the present disclosure.
Figure 8:
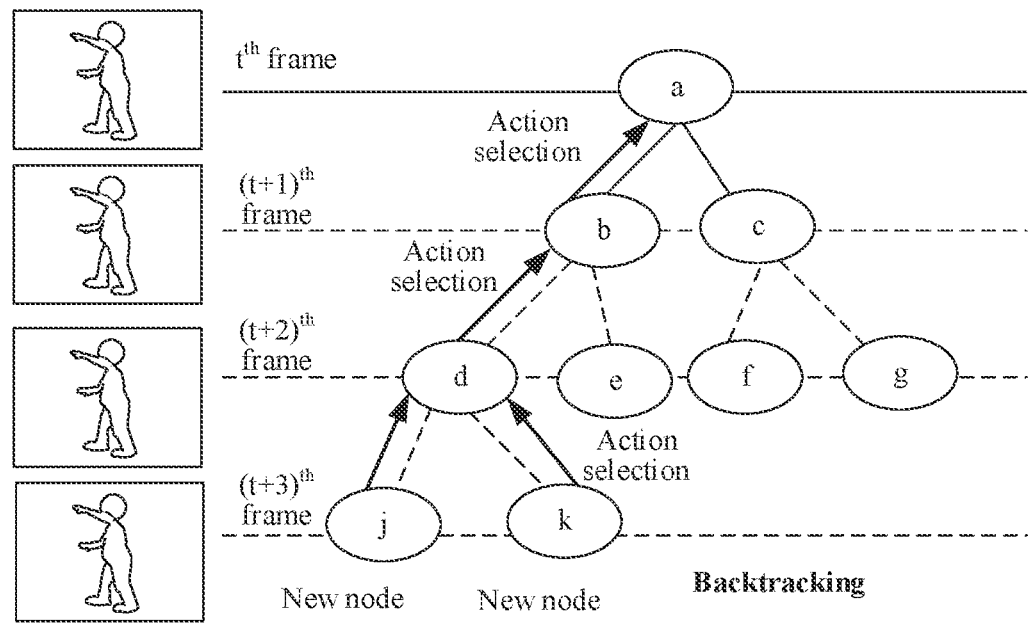
FIG. 8 is a schematic construction diagram of still another optional object tracking method according to an embodiment of the present disclosure.

As shown in FIG. 7 and FIG. 8, it is assumed that the target image frame is the $t^{th}$ image frame in the video stream data acquired by the target camera. In a case that it is determined that a to-be-tracked target object (a person object shown in the figure) detected in the $t^{th}$ image frame is not a globally-tracked object, the electronic device constructs a Monte Carlo tree for the target object according to T image frames following the $t^{th}$ image frame. As shown in FIG. 7, the Monte Carlo tree includes a node a as a root node, and nodes b to g and nodes j to k as child nodes.

After determining that each level of child nodes are generated, the electronic device backtracks and updates action values of the currently generated child nodes in the Monte Carlo tree. As shown in FIG. 7, it is assumed that an action B corresponding to the node b may be selected when an action is selected for the root node a after a level of child nodes corresponding to the $(t+1)^{th}$ frame are generated; an action D corresponding to the node d may be selected when an action is selected for the node b after a level of child nodes corresponding to the $(t+2)^{th}$ frame are generated: and an action K corresponding to the node k may be selected when an action is selected for the node d after a level of child nodes corresponding to the $(t+3)^{th}$ frame are generated.

As shown in FIG. 8, after determining, according to the foregoing embodiment, that the process of generating the new node j and the new node k in the $i^{th}$ level of child nodes in the Monte Carlo tree is completed, the electronic device may determine an updated action value of the node d based on a summation result obtained by performing a weighted summation on action values of the new node j and the new node k and a quantity of times of access to the node d. By analogy, an action value of the node b is updated until an upper-level parent node is the root node a.

In this embodiment provided in this application, an action value of a parent node is further updated according to action values of child nodes that belong to the parent node, so that an action value corresponding to a predicted next action is reflected in the parent node. That is, a predicted possibility is reflected in the parent node, so that when an action decision is made from top to bottom in the Monte Carlo tree, the accuracy of the decision is ensured, and a tracking trajectory can be further determined based on the foregoing path even when a target object is temporarily occluded, thereby avoiding a tracking failure.

In some embodiments, before the constructing a search recognition tree for the target object according to a position relationship pair database generated based on video stream data acquired by the target camera, the object tracking method further includes the following steps:

Step SD1: Obtain two image frames acquired at adjacent times in the video stream data acquired by the target camera, the two image frames including a first image frame and a second image frame.

Step SD2: Recognize a first candidate object from the first image frame and a second candidate object from the second image frame, and compare a key point position of the first candidate object with a key point position of the second candidate object.

Step SD3: Determine, when a comparison result indicates that the first candidate object is associated with the second candidate object, that the first candidate object and the second candidate object are the same object, and record the key point position of the first candidate object and the key point position of the second candidate object as a position relationship pair in the position relationship pair database.

Descriptions are specifically made with reference to the following example. Motion detection, target detection, and key point position detection are performed on two consecutive image frames in the video stream data, to recognize candidate objects in the two image frames.

For example, the two image frames that are acquired at adjacent times and that are obtained by the electronic device are respectively the $t^{th}$ image frame and the $(t+1)^{th}$ image frame. Next, the electronic device recognizes a first candidate object from the $t^{th}$ image frame and recognizes a second candidate object from the $(t+1)^{th}$ image frame, and compares key point positions of the two candidate objects. For example, key point position matching is performed on the two candidate objects by using a bipartite graph matching algorithm, to determine an association relationship. In a case that it is determined that the two candidate objects are associated, indicating that the first candidate object and the second candidate object are the same object, a position relationship pair (Oi(t), Oj(t+1)) between the first candidate object and the second candidate object can be further determined in the following manner: Oi(t) is used for representing that the object is a key point position of the $i^{th}$ object that is detected in the $t^{th}$ frame, and Oj(t+1) is used for representing that the object is a key point position of the $j^{th}$ object that is detected in the $(t+1)^{th}$ frame.

In this embodiment provided in this application, recognition and classification are performed on the video stream data to determine objects having an association relationship in two consecutive image frames, and a position relationship pair database corresponding to the video stream data is established according to the relationship, so that a predicted action is obtained based on the position relationship pair database, thereby further ensuring the authenticity and the accuracy of a constructed search recognition tree.

In some embodiments, predicting a target action of the target object in a next image frame following the target image frame according to action values of the child nodes in the search recognition tree includes the following steps:

Step SE1: Determine a target child node corresponding to a maximum action value from a level of child nodes corresponding to the subsequent image frame following the target image frame.

Step SE2: Use an action indicated by a key point position corresponding to the target child node as the target action.

Figure 9:
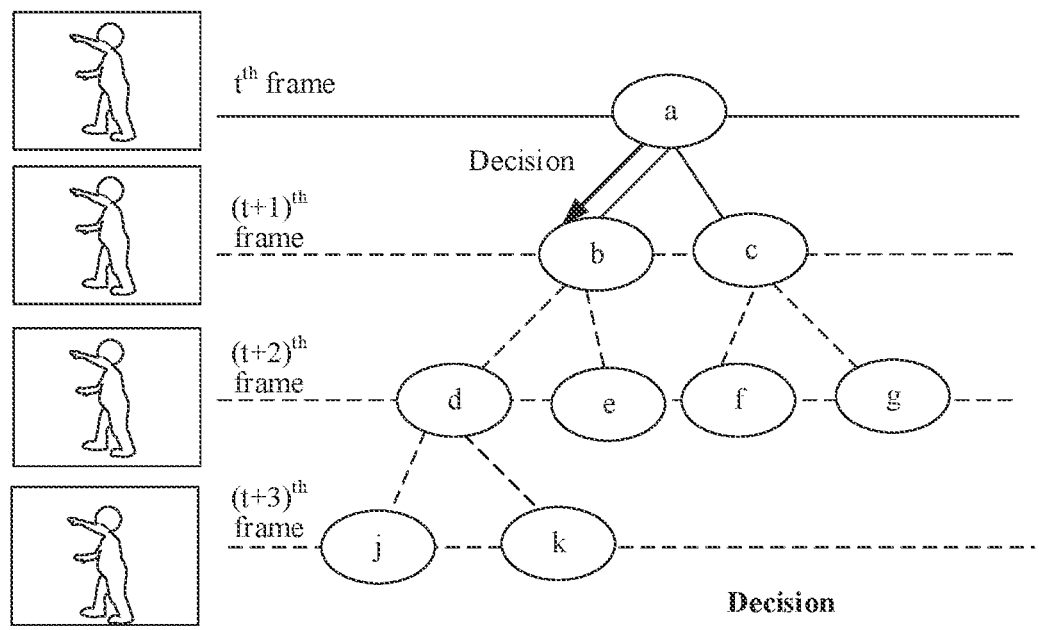
FIG. 9 is a schematic construction diagram of still another optional object tracking method according to an embodiment of the present disclosure.

As shown in FIG. 9, it is assumed that the target image frame is the $t^{th}$ image frame in the video stream data acquired by the target camera. In a case that the electronic device determines that a to-be-tracked target object (a person object shown in the figure) detected in the $t^{th}$ image frame is not a globally-tracked object, the electronic device may construct a Monte Carlo tree for the target object according to T image frames following the $t^{th}$ image frame. As shown in FIG. 9, the Monte Carlo tree includes a node a as a root node, and nodes b to g and nodes j to k as child nodes.

Further, it is assumed that, after it is determined, according to the foregoing embodiment, that the process of generating the new node j and the new node k in the i level of child nodes in the Monte Carlo tree is completed, the electronic device may further backtrack and update action values of the child nodes in the Monte Carlo tree.

Next, as shown in FIG. 9, the electronic device may make a decision based on updated action values, for example, decide to select an action B corresponding to the node b with a maximum action value in updated action values of child nodes corresponding to the $(t+1)^{th}$ frame as a target action, further decide to select an action E corresponding to the node e with a maximum action value in updated action values of child nodes corresponding to the $(t+2)^{th}$ frame as a target action, and decide to select an action K corresponding to the node k with a maximum action value in updated action values of child nodes corresponding to the $(t+3)^{th}$ frame as a target action.

In this embodiment provided in this application, a decision is made based on updated action values, and an action corresponding to a node with a maximum action value is selected as a target action. In this way, a predicted possibility is reflected in the parent node, so that when an action decision is made from top to bottom in the Monte Carlo tree, the accuracy of the decision is ensured, and a tracking trajectory can be further determined based on the foregoing path even when a target object is temporarily occluded, thereby avoiding a tracking failure.

In some embodiments, after obtaining a target image frame currently acquired by a target camera, the object tracking method further includes the following steps:

Step SF1: Perform motion detection on the target image frame.

Step SF2: Perform, in response to detecting that the target image frame includes a moving object, target detection on the moving object to obtain a first detection result, and perform key point position detection on the moving object to obtain a second detection result.

Step SF3: Compare the target object with the current globally-tracked object when the first detection result and the second detection result indicate that the moving object is the target object.

Step SF4: Determine, when the comparison result indicates that the target object does not match the current globally-tracked object, that the target object is not the current globally-tracked object.

In some embodiments, in this embodiment, the motion detection may include, but is not limited to: obtaining a moving foreground image by using an inter-frame difference, a Gaussian mixture model, and a motion detection method such as nuclear density estimation. For example, the foregoing motion detection process may include, but is not limited to the following steps: counting a quantity of pixels in the moving foreground image; when the quantity of pixels is less than a threshold, determining that a moving region is excessively small, considering that there is no moving object, and quickly returning: and when the quantity of pixels exceeds the threshold, considering, by the electronic device, that there is a moving object, and compressing a corresponding image frame into an image queue in a GPU pool.

In some embodiments, in this embodiment, after the target detection and the key point position detection, a detection result and a current tracking result are fused, and the following similarities, such as a position similarity and an appearance similarity, may be calculated, but the present disclosure is not limited thereto. For example, when a similarity is less than a threshold, it is considered that a new target enters a region monitored by the camera, and a new tracked object ID is allocated, and a Monte Carlo tree is configured for the tracked object ID. Next, the tracked object ID is searched for based on the Monte Carlo tree by using a Monte Carlo tree search algorithm, to obtain a tracking result corresponding to the object ID. Key point positions may be, but are not limited to, positions of a group of key points used for determining the target object. In an example in which the target object is a target person, the key point positions may be, but are not limited to, positions of 16 key points used for determining that the target person is performing a current action.

In this embodiment provide in this application, an image frame including a target object in the video stream data is determined through motion detection, target detection, and key point detection, so that searching and positioning are quickly performed based on the image frame, thereby improving the efficiency of determining a tracking trajectory of the target object.

For ease of description, the foregoing method embodiments are represented as a series of action combinations, but a person skilled in the art is to learn that the present disclosure is not limited to the described order of the actions because some steps may be performed in another order or performed simultaneously according to the present disclosure. In addition, a person skilled in the art is also to appreciate that all the embodiments described in the specification are preferred embodiments, and the related actions and modules are not necessarily mandatory to the present disclosure.

Figure 10:
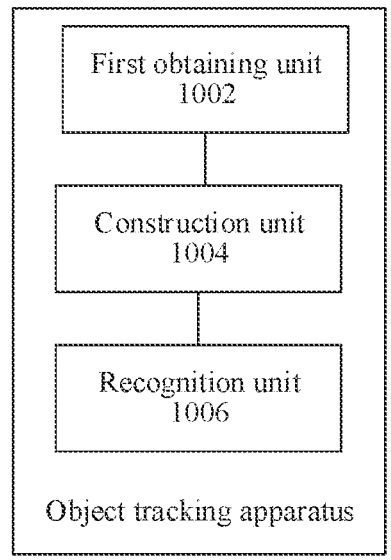
FIG. 10 is a schematic structural diagram of an optional object tracking apparatus according to an embodiment of the present disclosure.

According to another aspect of the embodiments of the present disclosure, an object tracking apparatus for implementing the object tracking method is further provided. As shown in FIG. 10, the apparatus includes:

1) a first obtaining unit 1002, configured to obtain a target image frame currently acquired by a target camera, the target image frame including a to-be-tracked target object; and 2) a construction unit 1004, configured to construct, in response to determining that the target object is not a current globally-tracked object, a search recognition tree for the target object according to a position relationship pair database generated based on video stream data acquired by the target camera, the search recognition tree including a root node and T levels of child nodes, the root node being a node corresponding to a target key point position of the target object in the target image frame, the $i^{th}$ level of child nodes in the T levels of child nodes including a node corresponding to a key point position obtained after the target object in the $i^{th}$ image frame following the target image frame performs a candidate action, i being less than or equal to T; and 3) a recognition unit 1006, configured to predict a target action of the target object in a subsequent image frame following the target image frame according to action values of the child nodes in the search recognition tree, the action value of each of the child nodes being used for indicating a similarity between the child node and the root node.

In some embodiments, in this embodiment, the object tracking method may be, but is not limited to, applied to an object monitoring platform application. The object monitoring platform application may be, but is not limited to, a platform application for real-time tracking and positioning of at least one selected target object based on images acquired by at least two image acquisition devices installed in a building. The image acquisition device may be, but is not limited to, a camera installed in the building, for example, an independent camera or an Internet of Things device equipped with a camera. The camera may include, but is not limited to at least one of the following: an RGB camera, a depth camera, and a sensor such as a lidar sensor. The building may be equipped with a map, for example, an electronic map, constructed based on building information modeling (BIM for short), but the present disclosure is not limited thereto. In the electronic map, positions of Internet of Things devices in the Internet of Things, for example, the position of the camera, are marked and displayed. As shown in FIG. 3, an object monitoring platform application APP-1 installed on a user terminal is configured to display video stream data acquired by a single camera, that is, an image acquisition device (which may also be referred to as a camera hereinafter) of which a device identification is ID-1, for example, display image frames acquired between 17:00 and 18:00. For example, an image frame A is a currently acquired target image frame and includes a to-be-tracked object 301.

In addition, in this embodiment, the target object may be, but is not limited to, a moving object recognized in an image, for example, a to-be-monitored person or vehicle. The image frame may be an image in discrete images acquired by the image acquisition device according to a predetermined period, or may be an image in a video recorded by the image acquisition device in real time. That is, an image source in this embodiment may be an image set or image frames in a video. This is not limited in this embodiment. In addition, the search recognition tree may include, but is not limited to, a Monte Carlo tree. The Monte Carlo tree is a search tool applied to an artificial intelligence problem for making the best decision, is generally an action planning form in a combinatorial game, and combines the generality of stochastic simulation and the accuracy of a tree search. The foregoing description is merely an example, which is not limited in this embodiment.

The object tracking apparatus shown in FIG. 2 may be used in the server 108 shown in FIG. 1, but the present disclosure is not limited thereto. After obtaining an image frame returned by a single image acquisition device 102 (which may also be referred to as a target camera hereinafter), the server 108 may construct a search recognition tree according to a position relationship pair database generated based on video stream data acquired by the single camera, so as to predict and recognize, based on the search recognition tree, an action performed by an occluded object, thereby avoiding the problem that a temporarily occluded object is likely to be lost during tracking in the related art.

In some embodiments, the construction unit 1004 includes:

1) a first obtaining module, configured to obtain T image frames acquired by the target camera after the target image frame; and 2) a processing module, configured to determine a current parent node to which the to-be-generated $i^{th}$ level of child nodes corresponding to the $i^{th}$ image frame belong; search the position relationship pair database for a target position relationship pair set associated with the current parent node, a similarity between a first key point position included in each target position relationship pair in the target position relationship pair set and a key point position corresponding to the current parent node being greater than a first threshold, and each position relationship pair in the position relationship pair database being used for recording key point positions that are of the same object before and after the object performs the candidate action and that are in two image frames acquired at adjacent times in the video stream data; obtain a second key point position matching the first key point position in the each target position relationship pair, an image frame in which the first key point position is located being ahead of an image frame in which the second key point position is located; generate the $i^{th}$ level of child nodes according to the second key point position; and obtain the $(i+1)^{th}$ image frame as the $i^{th}$ image frame when the $i^{th}$ level of child nodes are not the $T^{th}$ level of child nodes yet, return to the step of determining a current parent node to which the to-be-generated $i^{th}$ level of child nodes corresponding to the $i^{th}$ image frame belong to, and repeat the steps until the $i^{th}$ level of child nodes are the $T^{th}$ level of child nodes, to obtain the search recognition tree.

For a specific embodiment, reference may be made to the foregoing embodiments, and details are not described herein again.

In some embodiments, there is at least one second key point position. The processing module is further configured to generate a current object child node for a current second key point position; extract a first image feature corresponding to the current second key point position from the $i^{th}$ image frame; compare the first image feature with a second image feature that is extracted from the target image frame and that corresponds to the target key point position, to obtain a position similarity and an appearance similarity between the current object child node and the root node; determine an object similarity between the current object child node and the root node according to the position similarity and the appearance similarity; use the object similarity as an action value of the current object child node, and determine that the generation of the current object child node is completed; obtain a next second key point position from the at least one second key point position as a current second key point position, return to the step of generating a current object child node for a current second key point position, and repeat the steps until generation of object child nodes respectively corresponding to the at least one second key point position is completed; and determine the $i^{th}$ level of child nodes corresponding to the $i^{th}$ image frame according to the finally generated object child nodes respectively corresponding to the at least one second key point position.

For a specific embodiment, reference may be made to the foregoing embodiments, and details are not described herein again.

In some embodiments, the processing module is further configured to: after the $i^{th}$ level of child nodes are generated according to the second key point position, update an action value of the current parent node according to all action values of the $i^{th}$ level of child nodes: determine, when the current parent node is not the root node, an upper-level parent node to which the current parent node belongs, and update, according to all action values of child nodes at the same level as the current parent node, an action value of the upper-level parent node to which the current parent node belongs.

For a specific embodiment, reference may be made to the foregoing embodiments, and details are not described herein again.

In some embodiments, the object tracking apparatus further includes:

1) a second obtaining unit, configured to obtain, before the search recognition tree is constructed for the target object according to the position relationship pair database generated based on video stream data acquired by the target camera, two image frames acquired at adjacent times in the video stream data acquired by the target camera, the two image frames including a first image frame and a second image frame;

2) a first comparison unit, configured to recognize a first candidate object from the first image frame and a second candidate object from the second image frame, and compare a key point position of the first candidate object with a key point position of the second candidate object; and 3) a determining unit, configured to determine, when a comparison result indicates that the first candidate object is associated with the second candidate object, that the first candidate object and the second candidate object are the same object, and record the key point position of the first candidate object and the key point position of the second candidate object as a position relationship pair in the position relationship pair database.

For a specific embodiment, reference may be made to the foregoing embodiments, and details are not described herein again.

In some embodiments, the recognition unit 1006 includes:

1) a first determining module, configured to determine a target child node corresponding to a maximum action value from a level of child nodes corresponding to the subsequent image frame following the target image frame; and 2) a second determining module, configured to use an action indicated by a key point position corresponding to the target child node as the target action.

For a specific embodiment, reference may be made to the foregoing embodiments, and details are not described herein again.

In some embodiments, the apparatus further includes:

1) a first detection unit, configured to perform motion detection on the target image frame after the target image frame currently acquired by the target camera is obtained;

2) a second detection unit, configured to perform, in response to detecting that the target image frame includes a moving object, target detection on the moving object to obtain a first detection result, and perform key point position detection on the moving object to obtain a second detection result;

3) a second comparison unit, configured to compare the target object with the current globally-tracked object when the first detection result and the second detection result indicate that the moving object is the target object; and 4) an allocation unit, configured to determine, when the comparison result indicates that the target object does not match the current globally-tracked object, that the target object is not the current globally-tracked object.

For a specific embodiment, reference may be made to the foregoing embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 11:
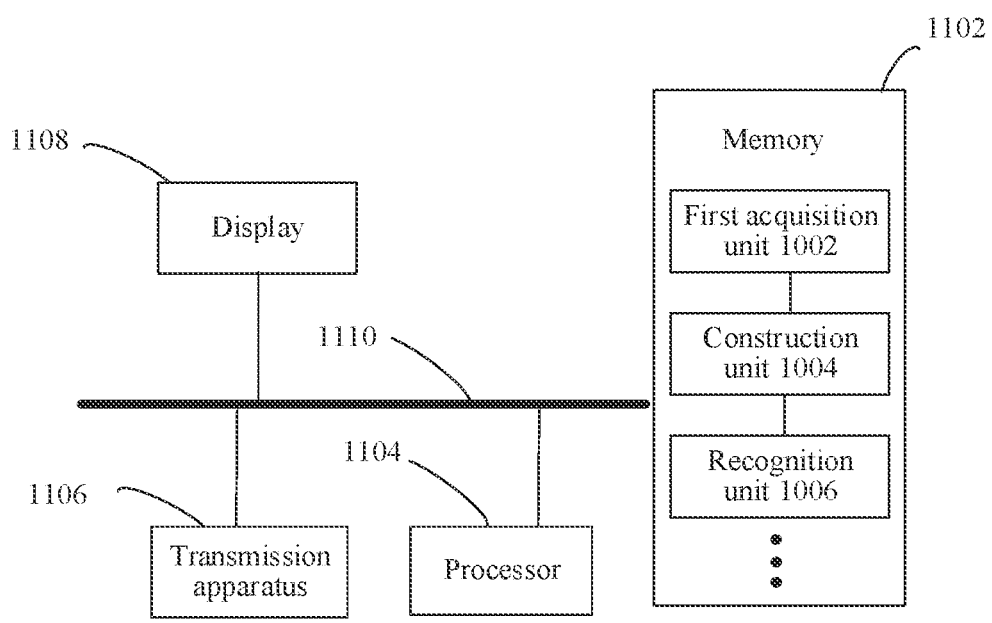
FIG. 11 is a schematic structural diagram of an optional electronic device according to an embodiment of the present disclosure.

According to another aspect of the embodiments of the present disclosure, an electronic device for implementing the object tracking method is further provided. The electronic device may be specifically the server mentioned in the foregoing embodiments. As shown in FIG. 11, the electronic device includes a memory 1102 and a processor 1104. The memory 1102 stores computer-readable instructions. The processor 1104 is configured to perform the steps in any one of the foregoing method embodiments through the computer-readable instructions.

In some embodiments, in this embodiment, the electronic device may be located in at least one of a plurality of network devices of a computer network.

For example, in some embodiments, the processor may be configured to perform the following steps through the computer-readable instructions: obtaining a target image frame currently acquired by a target camera, the target image frame including a to-be-tracked target object; constructing, in response to determining that the target object is not a current globally-tracked object, a search recognition tree for the target object by using a position relationship pair database generated based on video stream data acquired by the target camera, the search recognition tree including a root node and T levels of child nodes, the root node being a node corresponding to a target key point position of the target object in the target image frame, the $i^{th}$ level of child nodes in the T levels of child nodes including a node corresponding to a key point position obtained after the target object in the $i^{th}$ image frame following the target image frame performs a candidate action, i being less than or equal to T; and predicting a target action of the target object in a subsequent image frame following the target image frame according to action values of the child nodes in the search recognition tree, the action value of each of the child nodes being used for indicating a similarity between the child node and the root node.

In some embodiments, a person of ordinary skill in the art may understand that, the structure shown in FIG. 11 is only illustrative. The electronic device may also be a terminal device such as a smartphone (such as an Android mobile phone or an iOS mobile phone), a tablet computer, a palmtop computer, a mobile Internet device (MID), or a PAD. FIG. 11 does not limit the structure of the foregoing electronic device. For example, the electronic device may further include more or fewer components (such as a network interface) than those shown in FIG. 11, or have a configuration different from that shown in FIG. 11.

The memory 1102 may be configured to store software programs and modules, such as program instructions/modules corresponding to the object tracking method and apparatus in the embodiments of the present disclosure. The processor 1104 executes various function applications and data processing by running software programs stored in the memory 1102 and modules, to realize the object tracking method. The memory 1102 may include a high-speed random memory, and may also include a non-transitory memory, for example, one or more magnetic storage apparatuses, a flash memory, or another non-transitory solid-state memory. In some embodiments, the memory 1102 may further include memories remotely disposed relative to the processor 1104, and the remote memories may be connected to a terminal by using a network. Examples of the network include, but are not limited to, the Internet, an intranet, a local area network, a mobile communication network, and a combination thereof. The memory 1102 may be specifically configured to store information such as the target image frame and the content of the nodes in the search recognition tree, but the present disclosure is not limited thereto. In an example, as shown in FIG. 11, the memory 1102 may include, but is not limited to, a first obtaining unit 1002, a construction unit 1004, and a recognition unit 1006 in the object tracking apparatus. In addition, the memory may also include, but is not limited to, other module units in the object tracking apparatus, and details are not repeated in this example.

In some embodiments, a transmission apparatus 1106 is configured to receive or transmit data by using a network. Specific examples of the network may include a wired network and a wireless network. In an example, the transmission apparatus 1106 includes a network interface controller (NIC). The NIC may be connected to another network device and a router by using a network cable, so as to communicate with the Internet or a local area network. In an example, the transmission apparatus 1106 is a radio frequency (RF) module, which communicates with the Internet in a wireless manner.

In addition, the electronic device further includes: a display 1108, configured to display information such as the target image frame, and a connection bus 1110, configured to connect module components in the electronic device.

According to another aspect of the embodiments of the present disclosure, one or more non-transitory computer-readable storage media storing computer-readable instructions are provided, the computer-readable instructions, when executed by one or more processors, causing the one or more processors to perform the steps of the object tracking method in the foregoing embodiments.

In some embodiments, the storage medium may be configured to store a computer program for performing the following steps: obtaining a target image frame currently acquired by a target camera, the target image frame including a to-be-tracked target object; constructing, in response to determining that the target object is not a current globally-tracked object, a search recognition tree for the target object according to a position relationship pair database generated based on video stream data acquired by the target camera, the search recognition tree including a root node and T levels of child nodes, the root node being a node corresponding to a target key point position of the target object in the target image frame, the $i^{th}$ level of child nodes in the T levels of child nodes including a node corresponding to a key point position obtained after the target object in the $i^{th}$ image frame following the target image frame performs a candidate action, i being less than or equal to T; and predicting a target action of the target object in a subsequent image frame following the target image frame according to action values of the child nodes in the search recognition tree, the action value of each of the child nodes being used for indicating a similarity between the child node and the root node.

In some embodiments, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the embodiments of the present disclosure are merely for the description purpose but do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present disclosure essentially, or the part contributing to the prior art, or all or some of the technical solutions may be presented in the form of a software product. The computer software product is stored in the storage medium, and includes several instructions for instructing one or more computer devices (which may be a personal computer, a server, a network device, or the like) to perform all or some of the steps of the methods described in the embodiments of the present disclosure.

In the foregoing embodiments of the present disclosure, the descriptions of the embodiments have different focuses. For a part that is not detailed in an embodiment, reference may be made to the relevant description of other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate. Parts displayed as units may or may not be physical units, and may be located at one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

The foregoing descriptions are exemplary implementations of the present disclosure. A person of ordinary skill in the art may make some improvements and modifications without departing from the principle of the present disclosure and the improvements and modifications shall fall within the protection scope of the present disclosure.

What is claimed is:

1. An object tracking method performed by an electronic device, the method comprising:
   obtaining a target image frame currently acquired by a target camera, the target image frame including a to-be-tracked target object;
   in response to determining that the target object is not a current globally-tracked object, constructing a search recognition tree for the target object according to a position relationship pair database generated based on video stream data acquired by the target camera, the search recognition tree including a root node and T levels of child nodes, the root node being a node corresponding to a target key point position of the target object in the target image frame, the ith level of child nodes in the T levels of child nodes comprising a node corresponding to a key point position obtained after the target object in the ith image frame following the target image frame performs a candidate action, i being less than or equal to T; and predicting a target action of the target object in a subsequent image frame following the target image frame according to action values of the child nodes in the search recognition tree, the action value of each of the child nodes being used for indicating a similarity between the child node and the root node.

2. The method according to claim 1, wherein the constructing a search recognition tree for the target object according to a position relationship pair database generated based on video stream data acquired by the target camera comprises:

obtaining T image frames acquired by the target camera after the target image frame;

determining a current parent node to which the to-be-generated ith level of child nodes corresponding to the ith image frame belong;

searching the position relationship pair database for a target position relationship pair set associated with the current parent node, a similarity between a first key point position comprised in each target position relationship pair in the target position relationship pair set and a key point position corresponding to the current parent node being greater than a first threshold, and each position relationship pair in the position relationship pair database being used for recording key point positions that are of the same object before and after the object performs the candidate action and that are in two image frames acquired at adjacent times in the video stream data;

obtaining a second key point position matching the first key point position in the each target position relationship pair, an image frame in which the first key point position is located being ahead of an image frame in which the second key point position is located;

generating the $i^{th}$ level of child nodes according to the second key point position; and obtaining the $(i+1)^{th}$ image frame as the $i^{th}$ image frame when the $i^{th}$ level of child nodes are not the $T^{th}$ level of child nodes yet, returning to the operation of determining a current parent node to which the to-be-generated $i^{th}$ level of child nodes corresponding to the $i^{th}$ image frame belong, and repeating the operations until the $i^{th}$ level of child nodes are the $T^{th}$ level of child nodes, to obtain the search recognition tree.

3. The method according to claim 2, wherein there is at least one second key point position, and the generating the ith level of child nodes according to the second key point position comprises:

generating a current object child node for a current second key point position;

extracting a first image feature corresponding to the current second key point position from the $i^{th}$ image frame;

comparing the first image feature with a second image feature that is extracted from the target image frame and that corresponds to the target key point position, to obtain a position similarity and an appearance similarity between the current object child node and the root node;

determining an object similarity between the current object child node and the root node according to the position similarity and the appearance similarity;

using the object similarity as an action value of the current object child node, and determining that the generation of the current object child node is completed;

obtaining a next second key point position from the at least one second key point position as a current second key point position, returning to the operation of generating a current object child node for a current second key point position, and repeating the operations until generation of object child nodes respectively corresponding to the at least one second key point position is completed; and determining the $i^{th}$ level of child nodes corresponding to the $i^{th}$ image frame according to the finally generated object child nodes respectively corresponding to the at least one second key point position.

4. The method according to claim 3, wherein the method further comprises:

after generating the $i^{th}$ level of child nodes according to the second key point position:

updating an action value of the current parent node according to all action values of the $i^{th}$ level of child nodes;

determining, when the current parent node is not the root node, an upper-level parent node to which the current parent node belongs; and updating, according to all action values of child nodes at the same level as the current parent node, an action value of the upper-level parent node to which the current parent node belongs.

5. The method according to claim 1, wherein the method further comprises:

before constructing the search recognition tree for the target object:

obtaining two image frames acquired at adjacent times in the video stream data acquired by the target camera, the two image frames comprising a first image frame and a second image frame;

recognizing a first candidate object from the first image frame and a second candidate object from the second image frame, and comparing a key point position of the first candidate object with a key point position of the second candidate object; and determining, when a comparison result indicates that the first candidate object is associated with the second candidate object, that the first candidate object and the second candidate object are the same object, and recording the key point position of the first candidate object and the key point position of the second candidate object as a position relationship pair in the position relationship pair database.

6. The method according to claim 1, wherein the predicting a target action of the target object in a subsequent image frame following the target image frame according to action values of the child nodes in the search recognition tree comprises:

determining a target child node corresponding to a maximum action value from a level of child nodes corresponding to the subsequent image frame following the target image frame; and using an action indicated by a key point position corresponding to the target child node as the target action.

7. The method according to claim 1, wherein the method further comprises:

after obtaining the target image frame currently acquired by the target camera;

performing motion detection on the target image frame;

performing, in response to detecting that the target image frame comprises a moving object, target detection on the moving object to obtain a first detection result, and performing key point position detection on the moving object to obtain a second detection result;

comparing the target object with the current globally-tracked object when the first detection result and the second detection result indicate that the moving object is the target object; and determining, when the comparison result indicates that the target object does not match the current globally-tracked object, that the target object is not the current globally-tracked object.

8. An electronic device, comprising a memory and one or more processors, the memory storing computer-readable instructions, the computer-readable instructions, when executed by the one or more processors, causing the electronic device to perform a plurality of operations including:

obtaining a target image frame currently acquired by a target camera, the target image frame including a to-be-tracked target object;

in response to determining that the target object is not a current globally-tracked object, constructing a search recognition tree for the target object according to a position relationship pair database generated based on video stream data acquired by the target camera, the search recognition tree including a root node and T levels of child nodes, the root node being a node corresponding to a target key point position of the target object in the target image frame, the ith level of child nodes in the T levels of child nodes comprising a node corresponding to a key point position obtained after the target object in the ith image frame following the target image frame performs a candidate action, i being less than or equal to T; and predicting a target action of the target object in a subsequent image frame following the target image frame according to action values of the child nodes in the search recognition tree, the action value of each of the child nodes being used for indicating a similarity between the child node and the root node.

9. The electronic device according to claim 8, wherein the constructing a search recognition tree for the target object according to a position relationship pair database generated based on video stream data acquired by the target camera comprises:

obtaining T image frames acquired by the target camera after the target image frame;

determining a current parent node to which the to-be-generated ith level of child nodes corresponding to the ith image frame belong;

searching the position relationship pair database for a target position relationship pair set associated with the current parent node, a similarity between a first key point position comprised in each target position relationship pair in the target position relationship pair set and a key point position corresponding to the current parent node being greater than a first threshold, and each position relationship pair in the position relationship pair database being used for recording key point positions that are of the same object before and after the object performs the candidate action and that are in two image frames acquired at adjacent times in the video stream data;

obtaining a second key point position matching the first key point position in the each target position relationship pair, an image frame in which the first key point position is located being ahead of an image frame in which the second key point position is located;

generating the $i^{th}$ level of child nodes according to the second key point position; and obtaining the $(i+1)^{th}$ image frame as the $i^{th}$ image frame when the $i^{th}$ level of child nodes are not the $T^{th}$ level of child nodes yet, returning to the operation of determining a current parent node to which the to-be-generated $i^{th}$ level of child nodes corresponding to the $i^{th}$ image frame belong, and repeating the operations until the $i^{th}$ level of child nodes are the $T^{th}$ level of child nodes, to obtain the search recognition tree.

10. The electronic device according to claim 9, wherein there is at least one second key point position, and the generating the ith level of child nodes according to the second key point position comprises:

generating a current object child node for a current second key point position;

extracting a first image feature corresponding to the current second key point position from the $i^{th}$ image frame;

comparing the first image feature with a second image feature that is extracted from the target image frame and that corresponds to the target key point position, to obtain a position similarity and an appearance similarity between the current object child node and the root node;

determining an object similarity between the current object child node and the root node according to the position similarity and the appearance similarity;

using the object similarity as an action value of the current object child node, and determining that the generation of the current object child node is completed;

obtaining a next second key point position from the at least one second key point position as a current second key point position, returning to the operation of generating a current object child node for a current second key point position, and repeating the operations until generation of object child nodes respectively corresponding to the at least one second key point position is completed; and determining the $i^{th}$ level of child nodes corresponding to the $i^{th}$ image frame according to the finally generated object child nodes respectively corresponding to the at least one second key point position.

11. The electronic device according to claim 10, wherein the plurality of operations further comprise:

after generating the $i^{th}$ level of child nodes according to the second key point position:

updating an action value of the current parent node according to all action values of the $i^{th}$ level of child nodes;

determining, when the current parent node is not the root node, an upper-level parent node to which the current parent node belongs; and updating, according to all action values of child nodes at the same level as the current parent node, an action value of the upper-level parent node to which the current parent node belongs.

12. The electronic device according to claim 8, wherein the plurality of operations further comprise:

before constructing the search recognition tree for the target object:

obtaining two image frames acquired at adjacent times in the video stream data acquired by the target camera, the two image frames comprising a first image frame and a second image frame;

recognizing a first candidate object from the first image frame and a second candidate object from the second image frame, and comparing a key point position of the first candidate object with a key point position of the second candidate object; and determining, when a comparison result indicates that the first candidate object is associated with the second candidate object, that the first candidate object and the second candidate object are the same object, and recording the key point position of the first candidate object and the key point position of the second candidate object as a position relationship pair in the position relationship pair database.

13. The electronic device according to claim 8, wherein the predicting a target action of the target object in a subsequent image frame following the target image frame according to action values of the child nodes in the search recognition tree comprises:

determining a target child node corresponding to a maximum action value from a level of child nodes corresponding to the subsequent image frame following the target image frame; and using an action indicated by a key point position corresponding to the target child node as the target action.

14. The electronic device according to claim 8, wherein the plurality of operations further comprise:

after obtaining the target image frame currently acquired by the target camera:

performing motion detection on the target image frame;

performing, in response to detecting that the target image frame comprises a moving object, target detection on the moving object to obtain a first detection result, and performing key point position detection on the moving object to obtain a second detection result;

comparing the target object with the current globally-tracked object when the first detection result and the second detection result indicate that the moving object is the target object; and determining, when the comparison result indicates that the target object does not match the current globally-tracked object, that the target object is not the current globally-tracked object.

15. One or more non-transitory computer-readable storage media storing computer-readable instructions, the computer-readable instructions, when executed by one or more processors of an electronic device, causing the electronic device to perform a plurality of operations including:

obtaining a target image frame currently acquired by a target camera, the target image frame including a to-be-tracked target object;

in response to determining that the target object is not a current globally-tracked object, constructing a search recognition tree for the target object according to a position relationship pair database generated based on video stream data acquired by the target camera, the search recognition tree including a root node and T levels of child nodes, the root node being a node corresponding to a target key point position of the target object in the target image frame, the ith level of child nodes in the T levels of child nodes comprising a node corresponding to a key point position obtained after the target object in the ith image frame following the target image frame performs a candidate action, i being less than or equal to T; and predicting a target action of the target object in a subsequent image frame following the target image frame according to action values of the child nodes in the search recognition tree, the action value of each of the child nodes being used for indicating a similarity between the child node and the root node.

16. The non-transitory computer-readable storage media according to claim 15, wherein the constructing a search recognition tree for the target object according to a position relationship pair database generated based on video stream data acquired by the target camera comprises:

obtaining T image frames acquired by the target camera after the target image frame;

determining a current parent node to which the to-be-generated ith level of child nodes corresponding to the ith image frame belong;

searching the position relationship pair database for a target position relationship pair set associated with the current parent node, a similarity between a first key point position comprised in each target position relationship pair in the target position relationship pair set and a key point position corresponding to the current parent node being greater than a first threshold, and each position relationship pair in the position relationship pair database being used for recording key point positions that are of the same object before and after the object performs the candidate action and that are in two image frames acquired at adjacent times in the video stream data;

obtaining a second key point position matching the first key point position in the each target position relationship pair, an image frame in which the first key point position is located being ahead of an image frame in which the second key point position is located;

generating the $i^{th}$ level of child nodes according to the second key point position; and obtaining the $(i+1)^{th}$ image frame as the $i^{th}$ image frame when the $i^{th}$ level of child nodes are not the $T^{th}$ level of child nodes yet, returning to the operation of determining a current parent node to which the to-be-generated $i^{th}$ level of child nodes corresponding to the $i^{th}$ image frame belong, and repeating the operations until the $i^{th}$ level of child nodes are the $T^{th}$ level of child nodes, to obtain the search recognition tree.

17. The non-transitory computer-readable storage media according to claim 16, wherein there is at least one second key point position, and the generating the ith level of child nodes according to the second key point position comprises:

generating a current object child node for a current second key point position;

extracting a first image feature corresponding to the current second key point position from the $i^{th}$ image frame;

comparing the first image feature with a second image feature that is extracted from the target image frame and that corresponds to the target key point position, to obtain a position similarity and an appearance similarity between the current object child node and the root node;

determining an object similarity between the current object child node and the root node according to the position similarity and the appearance similarity;

using the object similarity as an action value of the current object child node, and determining that the generation of the current object child node is completed;

obtaining a next second key point position from the at least one second key point position as a current second key point position, returning to the operation of generating a current object child node for a current second key point position, and repeating the operations until generation of object child nodes respectively corresponding to the at least one second key point position is completed; and determining the $i^{th}$ level of child nodes corresponding to the $i^{th}$ image frame according to the finally generated object child nodes respectively corresponding to the at least one second key point position.

18. The non-transitory computer-readable storage media according to claim 15, wherein the plurality of operations further comprise:

before constructing the search recognition tree for the target object:

obtaining two image frames acquired at adjacent times in the video stream data acquired by the target camera, the two image frames comprising a first image frame and a second image frame;

recognizing a first candidate object from the first image frame and a second candidate object from the second image frame, and comparing a key point position of the first candidate object with a key point position of the second candidate object; and determining, when a comparison result indicates that the first candidate object is associated with the second candidate object, that the first candidate object and the second candidate object are the same object, and recording the key point position of the first candidate object and the key point position of the second candidate object as a position relationship pair in the position relationship pair database.

19. The non-transitory computer-readable storage media according to claim 15, wherein the predicting a target action of the target object in a subsequent image frame following the target image frame according to action values of the child nodes in the search recognition tree comprises:

determining a target child node corresponding to a maximum action value from a level of child nodes corresponding to the subsequent image frame following the target image frame; and using an action indicated by a key point position corresponding to the target child node as the target action.

20. The non-transitory computer-readable storage media according to claim 15, wherein the plurality of operations further comprise:

after obtaining the target image frame currently acquired by the target camera:

performing motion detection on the target image frame;

performing, in response to detecting that the target image frame comprises a moving object, target detection on the moving object to obtain a first detection result, and performing key point position detection on the moving object to obtain a second detection result;

comparing the target object with the current globally-tracked object when the first detection result and the second detection result indicate that the moving object is the target object; and determining, when the comparison result indicates that the target object does not match the current globally-tracked object, that the target object is not the current globally-tracked object.

* * * * *